Jan. 27, 1959          J. A. SCHUSTER          2,870,478

APPARATUS FOR HOLDING AND CLEANING SEVERED ANIMAL FEET

Filed May 7, 1956          2 Sheets-Sheet 1

JOHN A. SCHUSTER
*INVENTOR.*
HUEBNER, BEEHLER,
WORREL & HERZIG
ATTORNEYS

BY Richard M. Worrel

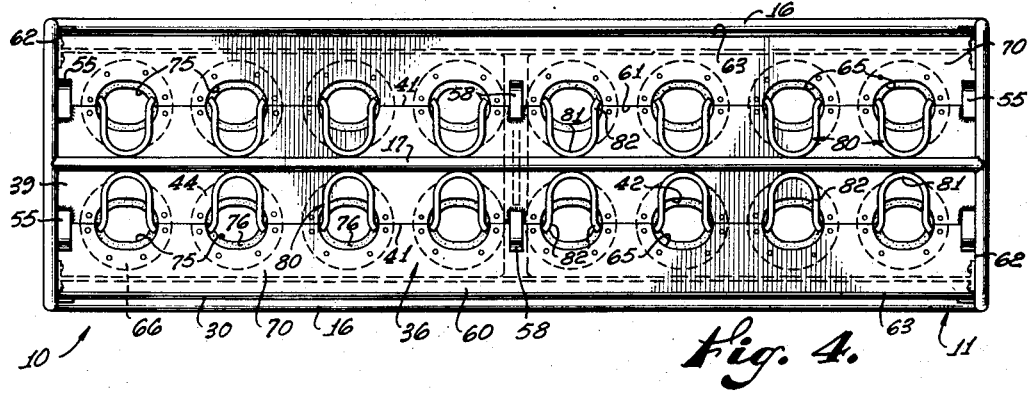

United States Patent Office 2,870,478
Patented Jan. 27, 1959

2,870,478

APPARATUS FOR HOLDING AND CLEANING SEVERED ANIMAL FEET

John A. Schuster, Bakersfield, Calif.

Application May 7, 1956, Serial No. 583,154

9 Claims. (Cl. 17—1)

The present invention relates to a method and apparatus for salvaging animal feet and more particularly for salvaging feet and attached shanks and hoofs and separating the hoofs from the feet of ungulate or hoofed mammals such as cattle, swine, sheep, and the like.

In the slaughtering of beef cattle, for example, it has been the practice to remove the feet from the carcass and to soak the hoofs in scalding water for a predetermined time. After their removal from the water, the hoofs pop off by striking them sharply with an instrument known in the industry as a knocker. The hoofs may then be sold at a very low cost for glue and the feet and attached shanks are disposed of as waste.

The Division of Meat Inspection of the Bureau of Animal Industry of the United States Government has regularly condemned hoofs and feet of beef cattle as unsantitary and not fit for human consumption. In fact, it has generally been regarded as impossible to clean the hoofs and feet in a sufficiently sanitary manner to be edible although it has been known that such feet could be used for soup or as meat similar to brisket, that the hoofs could serve as a soup base, and that they contained gelatin which could be used for consommé. Previous to the present invention, insofar as applicant is aware, methods or apparatus have not been known which could clean the feet and hoofs without contaminating and discoloring the shanks with dirt, animal refuse, and the like.

The solutions afforded by the present invention are so effective, however, that applicant has been informed by the Bureau of Animal Industry that his is the only approved method and apparatus for salvaging animal feet and hoofs so as to make the salvage available for human consumption.

Although conveniently described in relation to the salvaging of the feet and hoofs of beef cattle, it is to be understood that the invention can be equally as well employed in the cleaning and salvaging of many other types of animal feet and hoofs.

Accordingly, an object of the present invention is to enable the salvaging of feet and attached shanks and hoofs of slaughtered animals.

Another object is to clean animal's feet and hoofs in a sufficiently sanitary manner to prepare them for human consumption.

Another object is to salvage animals' feet and hoofs for use as meat, for use in gelatins and in soups, and for like purposes.

Another object is to enable the cleaning of animals' feet and hoofs without contaminating and discoloring the shanks attached thereto.

Another object is to provide an apparatus for shielding and sealing the hoofs and lower portions of animals' feet from their attached shanks to enable the cleaning of the hoofs and feet without contaminating the shanks.

Another object is to spread the hoofs of animals' feet to be cleaned in a manner to permit thorough cleaning of dirt and the like between the hoofs.

Another object is to provide a method and apparatus capable of accomplishing the foregoing objects which is simple and economical to make and use, durable in construction, dependable in operation, and which is highly effective for accomplishing its intended purposes.

These and other objects will become more fully apparent upon reference to the following description.

In the drawing;

Fig. 1 is a perspective view of a carrier employed with the present invention having portions broken away and in dashed lines in order to show several of internal details of the carrier.

Fig. 2 is a somewhat enlarged fragmentary transverse section of the carrier of Fig. 1 and a spray tank in which the carrier is positioned. An animal's foot is also shown mounted in the carrier.

Fig. 3 is a perspective view on a reduced scale of a spray tank and a scald tank as employed with the present invention.

Fig. 4 is a somewhat enlarged top plan view of the carrier of Fig. 1.

Fig. 5 is a somewhat enlarged fragmentary longitudinal section of the scald tank of Fig. 3 and of the carrier having an animal's foot therein.

Fig. 6 is a somewhat enlarged fragmentary side elevation of the carrier of Fig. 1 with exterior portions omitted to show the interior structure of the carrier.

Fig. 7 is a vertical transverse section taken on line 7—7 of Fig. 6.

Referring more particularly to the drawing, the apparatus of the present invention includes a carrier 10 best seen in Figs. 1, 4, and 7. The carrier has a frame, generally indicated by the numeral 11, which includes pairs of vertically disposed end legs 12 and upwardly convergent end rods 13 upwardly extended from the legs and interconnected at apices. Longitudinally extended side bars 16 interconnect corresponding legs at opposite sides of the frame, and a longitudinally extended top bar 17 rigidly interconnects the apices of the end rods. For purposes of later reference, the end legs and rods are considered as end sections for the frame held in rigid spaced, substantially parallel relation by the top and side bars.

Substantially rectangular end panels 20 are mounted in the end sections of the frame 11 and include outwardly extended top and bottom flanges 21 and 22, respectively, and inwardly extended substantially vertical side flanges 23 located along the legs 12 of the frame. Additionally, a pair of center panels 24 are mounted in the frame in substantially parallel relation to the end panels and provide substantially horizontal support edges 25 and substantially vertical guide edges 26. Side shields or panels 30 are secured to the vertical side flanges 23 of the end panels and along the vertical edges 26 of the center panels and are upwardly extended at opposite sides of the frame for a purpose to be set forth hereinafter. A stock support bracket 31 is secured to each end panel 20, and each bracket has a vertical flange 32 attached, as by bolts 33, to its respective end panel and an inwardly extended substantially horizontal flange 34. The horizontal flanges of the support brackets are in substantially co-planer relation to each other and with the horizontal support edges 25 of the center panels 24.

A foot stock 36 is provided in the carrier 10 which includes a stationary center plate 39 rigidly mounted in substantially horizontal position in the frame 11 having opposite end edges secured, as by bolts 40 to the end panels 20 and rested centrally on the horizontal flanges 34 of the support brackets 31. The center plate has top and bottom surfaces and opposite outer side edges 41 in which are provided a plurality of longitudinally spaced, semi-circular, outwardly disposed notches 42. Arcuate angle members 44 are secured by nuts and bolts 45 and 46 to the bottom of the center plate individually adjacent to the notches so as to provide semi-circular sockets 47 disposed outwardly along the side edges of the center plate. Semi-circular collar halves 48 are fitted in the sockets so as to extend edgewardly inwardly around the notches. The collar halves are made of some suitable resiliently compressible material, such as foam rubber, plastic, or the like.

End spring clips 55 provide inner ends secured at opposite ends of the center plate 39 on the top surface thereof and outer upwardly curved, somewhat resilient free ends extended outwardly of the side edges of the center plate above the horizontal flanges 34 of the stock support bracket 31. Further, center spring clips 58 provide inner ends secured centrally of the center plate in alignment with the end clips on corresponding sides of the center plate and outer upwardly curved, resilient ends extended over the horizontal support edges 25 of the center panels 24.

The foot stock 36 also includes a pair of removable outer plates 60 having inner side edges 61, opposite end edges 62, outer side edges 63, and top and bottom surfaces. The inner side edges provide a plurality of longitudinally spaced, semi-circular notches 65 complementary to the notches 42 in the center plate 39 and spaced at corresponding distances apart. A plurality of arcuate angle members 66 are secured by nuts and bolts 67 and 68 to the bottom of the outer plates adjacent to the notches so as to provide a plurality of sockets 69 adapted to receive resiliently compressible outer collar halves 70 extended inwardly around their respective notches.

The outer plates 60 are adapted to be mounted in the carrier frame 11 with their end edges 62 rested on the horizontal flanges 34 of the stock support brackets 31, with their inner side edges 61 received under the outer ends of the spring clips 55 and 58, and with their outer side edges 63 against the side flanges 23 of the end panels 20 and the vertical edges 26 of the center panels 24. In this manner the outer plates are mounted in co-planar relation with center plate 39 and with their notches 42 and 65 juxtaposed to form a plurality of openings 75 circumscribed by resiliently compressible collars 76 formed of the collar halves 48 and 70. The outer plates 60 are easily removed from the frame simply by lifting up on the outer side edges 63 thereof and pulling the outer plates upwardly along the vertical side flanges 23 and guide edges 26 and outwardly from underneath the spring clips.

A plurality of U-shaped shank holders 80 provide center portions 81 secured to the top bar 17 of the frame 11 in longitudinally spaced relation therealong. The shank holders also have resilient arms 82 outwardly extended on opposite sides of the top bar in corresponding vertically spaced relation to the notches 42 in the stationary center plate 39. The arms are thus in substantially vertical alignment with the openings 75 formed in the foot stock 36 and are for a purpose to be described hereinafter.

A pair of elongated support rails 86 is included and constitute foot rests in the carrier 10. Each rail is preferably a substantially flat rigid strip of metal and has opposite mounting end portions 87 connected, as by bolts 88 to the end panels 20. It is to be noted that the rails are positioned below the foot stock 36 and are spaced between the outer vertical side flanges 23 of the end panels and the outer side edges 41 of the center plate 39. The rail has a plurality of substantially triangular, integrally upwardly extended hoof-spreading prongs 90 having upper pointed apices 91 spaced outwardly of but in substantially common vertical planes transversely of the carrier 10 with corresponding openings 75 in the foot stock. Preferably, a rigid brace 93 interconnects the rails intermediate their ends in order to maintain the rails in their desired positions in the frame 11.

The carrier 10 is thus adapted to carry a plurality of animals' feet, as 100, having upwardly extended shanks 101 terminating in a hock or knee 102, having a rearwardly extended dew claw 103, and being capped by hoof portions 104. The foot illustrated is that of a cow or steer. The foot is placed in an opening 75 with the collar 76 in circumscribing, tightly sealing relation thereto so as effectively to isolate or shield the foot from its attached shank by means of the center and outer plates 39 and 60. The shank is fitted in the corresponding shank holder 80 and the hoof portions are thrust downwardly over the respective prong 90 so as to spread the portions of the hoof apart.

The carrier 10 is adapted to be supported in a spray tank 115 having a bottom wall 116, upwardly extended side walls 117, an open top, and a hinged cover 118. A lower delivery conduit 120 is extended lengthwise centrally along the bottom wall of the tank and is connected to an inlet pipe 121 in turn being connected to any convenient source of water at approximately 140 degrees F. to 150 degrees F. and at approximately sixty pounds per square inch pressure. A plurality of L-shaped conductors 122 provide substantially horizontal lower portions 123 connected at longitudinally spaced positions on opposite sides of the delivery conduit and upwardly extended vertical portions 124. The spacing between the conductors corresponds to the spacing between the openings 75 in the foot stock 36. Lower spray nozzles 125 are connected in the horizontal portions of the conductors and are directed substantially vertically upwardly. Side spray nozzles 127 are connected at upper ends of the vertical portions of the conductors and are directed in a substantially horizontal direction inwardly of the tank. A plurality of longitudinally spaced top spray nozzles 130 are mounted in the cover 118 by a top delivery conduit 132 interconnecting the top nozzles to the inlet pipe. The top nozzles are arranged in a pair of rows extended longitudinally of the tank and spaced slightly inwardly of the bottom nozzle. Additionally, it is to be noted that the top nozzles in each row are spaced substantially the same distance apart as the openings 75.

Carrier support brackets 136 are secured to the opposite end walls 117 of the spray tank 115 and are adapted to support the carrier 10 with the foot stock 36 substantially horizontally disposed so that feet 100 held therein are individually vertically positioned above the bottom spray nozzles 125 and horizontally inwardly adjacent to the side spray nozzles 126. In this position also, and with the cover 118 on the spray tank 115, the top spray nozzles 130 are located in vertically spaced relation individually above the shanks 101 of the feet.

A scald tank 138 having a bottom wall 139 and side walls 140 is also provided. A perforated steam coil 141 is mounted in the tank 138 and connected to any suitable source of steam. The scald tank has an upper overflow orifice 142 so as to maintain the depth of water 145 in the tank at a predetermined level. The carrier 10 is positioned in the tank 138 with the legs 12 rested on the bottom wall 139 so as to support the foot stock 36 and rails 86 above the steam coil. The overflow orifice maintains the water in the tank to a depth sufficient to cover the hoofs 104 of the feet and so that the surface of the water is just below the foot stock.

Operation

The operation of the described embodiment of the present invention is believed to be readily apparent and is briefly summarized at this point.

Preliminarily, it is to be noted that in the normal operation of a slaughterhouse or abattoir, animal feet, such as 100, are removed from the carcass of the animal, not shown, on what is known in the art as the kill floor. In use of the present invention, the feet are then placed in the carrier 10. This is accomplished by removing the outer plates 60 of the foot stock 36 and by placing the feet individually against the inner collar halves 48 on the center plate 39 and by thrusting the hoof portions 104 downwardly against the spreader prongs 90 therebelow. This spreads the hoof portions apart and facilitates cleaning therebetween in a manner to be described. Also, the shanks 101 are fitted in the shank holders 80 being held therein by the resilience of the arms 82.

The outer plates 60 are then inserted in the carrier 10, in the manner indicated in dashed lines in Fig. 7, with their end edges 62 rested on the horizontal flanges 34 of the support brackets 31, the inner side edges 61 under the spring clips 55 and 58, and with their outer side edges against the shields 30. This presses the outer collar halves 70 against the feet 100 above the hoofs so that the collars 76 are in tight circumscribing sealing relation to the feet. The foot stock 36, therefore, acts as a shield between the lower parts of the foot including the hoofs 104 and the upwardly extended shanks 101.

When the carrier 10 is filled, it is placed in the spray tank 115 on the support brackets 136 and the cover 118 closed. Water is then supplied to the delivery conduits 120 and 132 through pipe 121 so as to force water to spray out of the spray nozzles 125, 127, and 130. The bottom spray nozzles eject water upwardly against the bottom of the feet 100 and between the hoof portions 104 held apart by the prongs 90. The side spray nozzles clean off the forward parts of the hoofs and the feet. Of course, the top spray nozzles clean the shanks. It is to be noted, however, that the foot stock 36 and shields 30 prevent water, dirt, or animal refuse from splattering upwardly from the hoofs, which are ordinarily the dirtiest part of the feet, onto the shanks thereby preventing contamination or discoloration of the shanks. The foot stock and shields, therefore, act to isolate the shanks from the hoofs and lower portions of the feet.

When the feet 100 are cleaned, the cover 118 is lifted and the carrier 10 is removed from the spray tank 115 and placed in the scald tank 140. The water 145 in the scald tank is maintained at approximately 212 degrees F. and the feet are immersed in about two and one-half inches of water so that the water covers the hoof portions 104 but does not reach the foot stock 36. This is best seen in Fig. 5. The feet remain in the scald tank for approximately 10 to 12 minutes whereupon the carrier is removed from the scald tank. The hoof portions 104 are then sharply struck with an instrument known as a knocker, not shown, which causes the hoof portions with any dirt still attached thereto to snap or pop off the feet because of described soaking in the scalding water.

The carrier 10 is then repositioned in the spray tank 115 and the feet 100 are given a final washing with a high pressure spray. The feet are trimmed and removed from the foot stock 36 after releasing the outer plates 60. The hide is next trimmed from the shank leaving the shank and feet in a clean and sanitary condition. Finally, the feet and attached shanks 101 are chilled in a suitable manner for preservation purposes.

From the foregoing, it will be evident that this invention provides a highly effective method and apparatus for salvaging animal feet. Of significance is the shielding which the carrier provides between the shanks and hoofs of the feet so as to maintain the shanks in clean condition during washing of the hoofs. The carrier holds the feet firmly and properly positioned and opens the hoof portion for cleaning purposes. The carrier is designed to cooperate with the spray nozzles and the scald tank to enable thorough cleaning and soaking of the feet for subsequent hoof removal.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for holding the dismembered foot and attached shank of an animal to facilitate cleaning of the foot without contaminating the shank comprising a frame; and a foot stock including a central stationary plate rigidly mounted in the frame having an edge providing an outwardly disposed notch, an outer plate having an edge providing an inwardly disposed notch, and being removably mounted in the frame in substantially coplanar relation with the central plate and with the notches fitted together to form an opening in the stock adapted to receive the foot of an animal, and resilient collar members mounted on the plate along the edges of the notches, the collar members on the stationary and outer plates being transversely extended edgewardly outwardly and inwardly, respectively, of their respective notches for circumscribing sealing engagement with a foot received in said opening thereby effectively to separate said foot from the shank for cleaning purposes.

2. An apparatus for holding an animal foot having hoof portions and a shank to facilitate cleaning of the foot without contaminating the shank comprising a frame; a foot stock including a central stationary plate rigidly mounted in the frame having an edge providing an outwardly disposed notch, an outer plate having an edge providing an inwardly disposed notch and being removably mounted in the frame in substantially coplanar relation with the central plate and with the notches juxtapositioned to form an opening in the stock adapted to receive the foot of an animal, and resilient collar members mounted on the plates around the notches and extended transversely of said edges inwardly and outwardly of the outer and stationary plates, respectively, for circumscribing sealing engagement with a foot received in said opening; and a foot rest mounted in the frame having a prong extended toward the stock beneath the opening therein adapted to fit between the hoof portions on a foot in the stock to spread said portions apart.

3. An apparatus for holding an animal foot having hoof portions and a shank to facilitate cleaning of the foot without contaminating the shank comprising a frame; a foot stock including a central stationary plate rigidly mounted in the frame having an edge providing an outwardly disposed notch, an outer plate having an edge providing an inwardly disposed notch and being removably mounted in the frame in substantially coplanar relation with the central plate and with the notches juxtapositioned to form an opening in the stock adapted to receive the foot of an animal, and resilient collar members mounted on the plates around the notches and extended relatively inwardly and outwardly of the notches toward the collar member on their respectively juxtapositioned notches for circumscribing sealing engagement with a foot received in said opening; a foot rest mounted in the frame having a prong extended toward the stock beneath the opening therein adapted to fit between the hoof portions on a foot in the stock to spread said portions apart; and a shank holder mounted in the frame on the opposite side of the stock from the foot rest adapted to hold the shank of a foot in the stock.

4. An apparatus for cleaning animals' feet having hoof portions and shanks without contaminating the shanks with dirt and refuse from the hook portions comprising a support, a plate mounted in substantially horizontal position in the support having upper and lower sides and an opening adapted to receive the foot of an animal with the hoof portions extended downwardly from the plate and with the shank extended upwardly from the plate, an annular resiliently compressible collar mounted on the plate in circumscribing relation to the opening and adapted for circumscribing sealing engagement with a foot extended through the opening, spray means mounted in the support below the plate directed toward the plate and therefore a hoof portion of a foot extended through the opening, and means connected to the spray means for supplying washing fluid under pressure to the spray means for spraying such fluid against hoof portions, the plate and the collar acting to shield the hoof portion from the shank and to prevent splattering of washing fluid, dirt and refuse upwardly onto the shank.

5. An apparatus for cleaning animals' feet having hoof portions and shanks without contaminating the shanks with dirt and refuse from the hoof portions comprising a support, a plate mounted in substantially horizontal position in the support having upper and lower sides and an opening adapted to receive the foot of an animal with the hoof portions extended downwardly from the plate and with the shank extended upwardly from the plate, an annular resiliently compressible collar mounted on the plate in circumscribing relation to the opening and adapted for circumscribing sealing engagement with a foot extended through the opening, spray means mounted in the support below the plate directed toward a hoof portion of a foot extended through the opening, shielding panels mounted on the plate and upwardly extended therefrom around the opening, spray nozzles mounted in the support below the plate directed toward the plate and thus toward a hoof portion of a foot extended through the opening, and means connected to the nozzles for supplying washing fluid under pressure to the nozzles for spraying such fluid against said hoof portions, the plate and the collar acting to shield said hoof portions from the shank and to prevent splattering of washing fluid, dirt and refuse upwardly onto the shank.

6. An apparatus for cleaning animals' feet having hoof portions and shanks without contaminating the shanks with dirt and refuse from the hoof portions comprising a support, a plate mounted in substantially horizontal position in the support having upper and lower sides and an opening adapted to receive the foot of an animal with the hoof portions extended downwardly from the plate and with the shank extended upwardly from the plate, an annular resiliently compressible collar mounted on the plate in circumscribing relation to the opening and adapted for circumscribing sealing engagement with a foot extended through the opening, a spreader prong mounted in the support below the plate adapted to fit between the hoof portion of a foot extended through the opening so as to spread the hoof portions apart, a lower upright spray nozzle mounted in the support below the plate in substantially vertical alignment with the opening so as to direct a spray upwardly toward the plate onto and between the hoof portions, a substantially horizontal side spray nozzle mounted in the support in horizontally and vertically spaced relation to the lower spray nozzle for directing a substantially horizontal spray inwardly of the plate onto the hoof portions of a foot extended through the opening, and means connected to the nozzles for supplying washing fluid under pressure to the spray nozzles, the plate and the collar acting to shield the hoof portions from the shank and to prevent splattering of washing fluid, dirt and refuse upwardly onto the shank.

7. An apparatus for carrying a plurality of feet of beef cattle which feet are dismembered from the cattle by slaughtering and each of which feet includes an upwardly extended shank, and lower forwardly extended spreadable hoof portions comprising a frame including a pair of spaced end sections having downwardly extended legs and upwardly convergent arms interconnected at apices, longitudinally extended side rods rigidly interconnecting corresponding legs of the sections, and a longitudinally extended top rod rigidly interconnecting the apices of the arms; spaced substantially parallel upright end panels mounted in the end sections of the frame having substantially vertical marginal guide flanges extended inwardly of the frame along the legs thereof; substantially horizontal stock support brackets mounted on the end panels extended inwardly of the frame; central panels mounted in the frame between the end panels having substantially horizontal stock support edges in substantially the same plane as the stock support brackets and substantially vertical guide edges longitudinally aligned with the vertical guide flanges of the end panels; a pair of side shields mounted in erect position on opposite sides of the frame against the guide flanges of the end panels and the guide edges of the central panels; a foot stock including a center plate fixedly secured in substantially horizontal position in the frame having opposite end edges connected to the end panels and outer side edges providing a plurality of longitudinally spaced outwardly disposed semi-circular notches, semi-circular inner collar portions of resiliently compressible material mounted on the center plate and individually edgewardly extended outwardly transversely of the side edges of the center plate along the notches, removable outer plates having opposite end edges rested on the support brackets to position the outer plates in substantially the same horizontal plane as the center plate and inner side edges providing a plurality of semi-circular notches corresponding in number and location to the notches in adjacent side edges of the center plate, the outer plates having outer edges against the guide flanges of the end panels and the guide edges of the center panels, semi-circular outer collar portions of resiliently compressible material mounted on the outer plates and individually edgewardly extended inwardly transversely of the side edges of the outer plates along the notches therein to form substantially circular collars with the inner collar portions adapted for sealing engagement around the feet of cattle with the hoof portions downwardly extended and the shanks upwardly extended from the center plate; outwardly extended spring clips secured to the center plate of the foot stock resiliently bearing downwardly on the outer plates; a pair of rails having opposite ends secured to the end panels, longitudinally extended beneath the foot stock, and having a plurality of upwardly extended triangularly shaped prongs individually positioned forwardly below the circular collars and adapted to fit between the separable hoof portions of the feet held in the stock to spread the portions apart; and a plurality of outwardly open substantially U-shaped resiliently flexible shank holders mounted on the top rod in vertical alignment with the collars adapted to receive the shanks of feet held in the stock.

8. An apparatus for cleaning animals' feet having hoof portions and shanks without contaminating the shanks with dirt and refuse from the hoof portions comprising a support, an elongated plate mounted in substantially horizontal position in the support having upper and lower sides and a plurality of openings arranged in a row in the plate and in predetermined longitudinally spaced relation to each other for individually receiving animals' feet with the hoof portions extended downwardly from the plate and with the shanks extended upwardly from the plate, resiliently compressible means mounted on the plate in circumscribing relation to the opening extended radially inwardly relative to the opening for circumscribing sealing engagement in fluid-tight relation with a foot extended through the opening, a plurality of spray nozzles mounted in the support below the plate and arranged in a row in longitudinally spaced relation to each other, adjacent nozzles being spaced the same distance apart as adjacent openings and there being a nozzle directed upwardly toward each opening and in generally the same vertical plane as such opening for directing a spray of fluid upwardly onto the hoof portion of an animal's foot extended through the opening, and means connected to the nozzles for delivering washing fluid under pressure thereto, the plate and the resiliently compressible sealing means acting to shield the hoof portion from the shank and to prevent splattering of washing fluid, dirt and refuse upwardly onto the shank.

9. The combination of a spray tank; an elongated row of lower upwardly directed spray nozzles mounted in the tank in predetermined longitudinally spaced relation to each other; an elongated row of side spray nozzles mounted in the tank in upwardly spaced relation to and individually lying in substantially the same vertical planes as the lower nozzles and directed inwardly of the tank; an elongated row of upper downwardly directed spray nozzles mounted in the tank above the side spray nozzles and individually lying in substantially the same vertical planes as the side and lower spray nozzles; an elongated main plate mounted in substantially horizontal position in the tank between the upper and side spray nozzles having upper and lower surfaces, an outwardly directed side edge, and a plurality of notches longitudinally spaced along the side edge and individually lying in said vertical planes of the nozzles; resiliently compressible collar halves mounted on the plate and extended transversely of said outer side edge relatively outwardly of the plate along the notches therein; an elongated outer plate having upper and lower surfaces, an inner side edge, and a plurality of notches longitudinally spaced along the inner edge; means releasably mounting the outer plate in substantially horizontal position in the plane of the main plate with the notches of the plates in complementarily juxtapositioned relation; outer resiliently compressible collar halves mounted on the outer plate extended transversely of said inner side edge relatively toward the main plate along the notches in the outer plate and forming with their respectively adjacent inner collar halves annular collars adapted individually to receive animals' feet having hoof portions extended below the plates and shanks extended above the plates; and means connected to the nozzles for delivering washing fluid thereto to be sprayed by the lower and side nozzles upwardly and laterally against the hook portions and downwardly by the upper nozzles onto the shanks, the plate and the collars serving to shield the shanks from the hoof portions to prevent the shank from being contaminated by dirt and refuse splattering upwardly from the hoof portions.

References Cited in the file of this patent

UNITED STATES PATENTS

| | | |
|---|---|---|
| 1,059,339 | Bloss | Apr. 22, 1913 |
| 1,100,754 | Lueth | June 23, 1914 |
| 1,377,833 | Hoisington | May 10, 1921 |
| 2,186,273 | Schmidt | Jan. 9, 1940 |
| 2,529,530 | Abildgaard et al. | Nov. 14, 1950 |
| 2,544,437 | Stow | Mar. 6, 1951 |
| 2,640,225 | Force et al. | June 2, 1953 |